G. E. RIPLEY, W. N. GLADSON & R. E. THOMPSON.
PROJECTING APPARATUS FOR MOVING PICTURE MACHINES.
APPLICATION FILED NOV. 21, 1911.
1,091,864.
Patented Mar. 31, 1914.
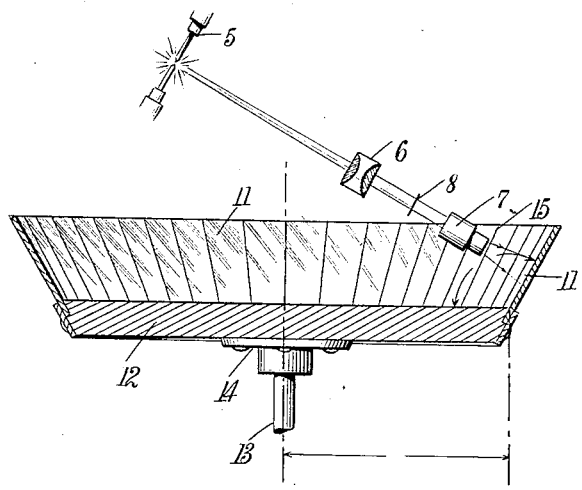
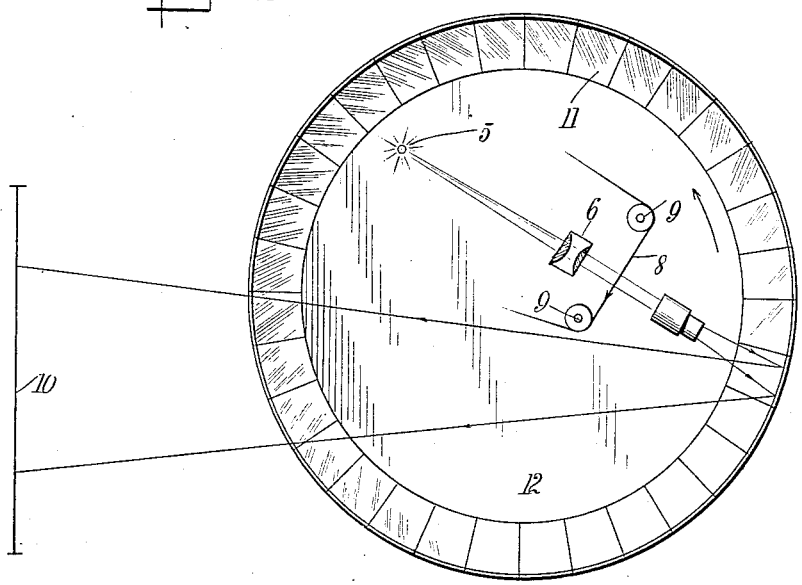

UNITED STATES PATENT OFFICE.

GILES EMMET RIPLEY AND WILLIAM N. GLADSON, OF FAYETTEVILLE, AND ROSS EMILE THOMPSON, OF HEBER, ARKANSAS.

PROJECTING APPARATUS FOR MOVING-PICTURE MACHINES.

1,091,864.   Specification of Letters Patent.   Patented Mar. 31, 1914.

Application filed November 21, 1911. Serial No. 661,579.

*To all whom it may concern:*

Be it known that we, GILES E. RIPLEY and WILLIAM N. GLADSON, residents of Fayetteville, in the county of Washington and State of Arkansas, and Ross E. THOMPSON, a resident of Heber, in the county of Cleburne and State of Arkansas, all citizens of the United States, have invented a new and Improved Projecting Apparatus for Moving-Picture Machines, of which the following is a full, clear, and exact description.

The invention is an improvement in projecting apparatus for moving picture machines, and has in view a reflecting mechanism to cause the image of one picture to dissolve into the next without employing a tinted or softening light, or otherwise lessening the brilliancy of the screen during the picture change, and this invention is regarded as an improvement over our device patented April 30, 1912, No. 1,025,074. We accomplish this object by disposing a number of reflecting mirrors upon the inner face of a revolving wheel, which wheel is in the shape of the frustum of a pyramid, and receives the images at an angle to the axis of the wheel and at an angle to the plane of the wheel. Each reflecting member, as it moves through the active portion of its path of travel, causes the reflected rays to travel across the screen at the same time that a picture on the film is moving through the cone of light from the condensing lenses, thereby holding the field on the screen stationary, and causing one picture to dissolve into the next. If the successive pictures on the moving film are identical, the reflected pictures on the screen will be stationary, but if the successive pictures on the film show a change of position of the object photographed, the reflected pictures will show a like change. Each reflecting member, as it moves into an active position, sends its part of the picture to the screen at the point where the picture of the advanced active member is just dissolving.

Reference is to be had to the accompanying drawings forming a part of this specification, in which similar characters of reference indicate corresponding parts in both the views, and in which—

Figure 1 is a transverse sectional view through a reflecting wheel, showing a preferred embodiment of our invention, with the essential projecting features shown in elevation; and Fig. 2 is a plan view, looking down upon the device shown in Fig. 1.

For the purpose of illustrating the nature and application of our invention, we have shown diagrammatically the prime features of a moving-picture machine, in which 5 is a source of light, 6 the condensing lens, 7 the projecting lens, and 8 the film passing between the two sets of lenses over the guide rollers 9. To cause one picture to dissolve into the next on the screen 10 without softening or tinting the light, or otherwise lessening the brilliancy of the light on the screen, we provide a reflecting mechanism, comprising a series of mirrors or other reflecting members 11, which are arranged relative to the machine, to successively pass into active position with respect to the rays from the lens 7, the mirrors being guided in a curved path in passing through the active sphere of their travel, the radius of which curve depends on the position of the mirrors in the path of light and the focal length of the lenses. To carry out this mode of operation, the reflecting members are set at an angle to and extend from one side of the periphery of a revolving wheel 12, which wheel is mounted upon an actuating shaft 13 by any suitable mechanism, as by means of a bearing plate 14. All of these mirrors are plain, are in contact along their longitudinal edges 15, and together form, in effect, the inner surface of a wheel in the form of the frustum of a pyramid. The angular disposition of these mirrors with reference to the plane of the wheel may be varied from 90° to nearly 180°, depending on the width of the mirrors, the radius of the wheel, and the reëntrant angle between the mirrors necessary to give the proper projection on the screen.

As shown in the drawings, the incident rays are projected on the mirrors at an acute angle to both the plane of the wheel and the axis of the wheel, thereby permitting the reflected rays to reach the screen without interference. The wheel 12 is driven in a direction opposite to the direction of movement of the film, and in such sequence thereto that as the center of each picture reaches an axial position between the lenses, the axial rays of the latter will strike the center of the actively-disposed mirror. The mirrors, by moving on the arc of a circle, with their centers tangent to the radii of the circle and their planes normal to them when of the proper width and properly placed in the light, will make such an angle with one another as will cause the image of one picture to dissolve into the next, the film moving continuously and at such a rate that as a picture moves through the path of light, a mirror has also moved through it, but in the opposite direction. If two pictures are exactly alike, one will pass into the other so that the eye is not able to note the change. The mirrors, of course, must come into play with a certain angle to each other, as above set out, and hold this angle as long as they receive the light. After they cease being active, then this angle may vary.

Having thus described our invention, we claim as new and desire to secure by Letters Patent:—

1. In a projecting apparatus for moving-picture mechanisms, a wheel, and a series of plain mirrors rigidly mounted upon the periphery of said wheel, said mirrors being disposed at an angle to the plane and axis of the wheel.

2. In a projecting apparatus for moving-picture mechanisms, a revolving wheel disposed in a plane at an acute angle to the incident ray from the mechanism, and plain mirrors carried by said wheel, said mirrors disposed at an angle to said plane and adapted to be successively brought into the path of the incident rays.

3. In a projecting apparatus for moving-picture mechanisms, a series of reflecting members facing a common center and arranged to form a reflecting surface in the form of the frustum of a pyramid between the projecting lens and the screen.

4. In a projecting apparatus for moving-picture mechanisms, a series of reflecting members disposed to form the inner face of a wheel and arranged at an angle to the axis of the wheel.

5. The combination of a moving-picture machine having a picture-film moving in one direction, a series of mirrors forming the inner surface of a wheel, moving in the opposite direction, the mirrors being disposed at an angle to the axis of the wheel and arranged to successively pass in the lighted field of the machine, to cause one picture to fade into the next succeeding picture.

6. In a moving-picture machine, a series of plain mirrors arranged in a circle, with their adjacent edges in contact, said mirrors facing a common center and arranged to form a reflecting surface in the shape of the frustum of a pyramid, the mirrors being adapted to be successively brought into the path of the incident picture rays to receive and reflect the same.

7. In a projecting apparatus for moving picture mechanisms, a wheel, and a series of reflecting members mounted upon the periphery of the wheel and projecting at one side thereof, the inner face of said members forming the reflecting surface.

8. In a projecting apparatus for moving-picture mechanisms, a wheel mounted to turn, and a series of mirrors extending from the periphery of the wheel at one side thereof, and at an angle to the plane and the axis of the wheel, the inner faces of the mirrors forming the reflecting surface.

9. In a projecting apparatus for moving-picture mechanisms, a revolving wheel, and a series of reflecting members arranged in a circle on the periphery of said wheel, the inner faces of said members forming the reflecting surface, the said members being arranged in the form of the frustum of a pyramid.

10. In a moving picture machine, the combination with a picture film arranged to move in one direction, of a support mounted to turn in the opposite direction, and a series of plain mirrors carried by said support, and arranged in a circle with their adjacent edges in contact, the inner faces of said mirrors forming the reflecting surface, the said mirrors extending at an angle to the axis of the support and arranged to successively pass in the lighted field of the machine.

11. In a projecting apparatus for moving picture mechanisms, a revolving wheel, and reflecting means disposed to form the inner face of said wheel and arranged at an angle to the plane and axis of the wheel.

12. In a projecting apparatus for moving picture mechanisms, a support arranged in a horizontal plane, a vertical actuating shaft on which the support is mounted, and reflecting means arranged in the form of a circle and carried by said support at the periphery thereof, the said reflecting means extending upward and outward at an angle to the plane and axis of the support.

13. In a moving picture machine, the combination with a source of light, the lenses, and the film arranged to move in one direction, of a support mounted to turn in the opposite direction, and a series of reflecting members carried by said support and arranged to receive and reflect the incident rays, the said reflecting members being disposed at an angle to the plane and axis of the support.

In testimony whereof we have signed our names to this specification in the presence of two subscribing witnesses.

GILES EMMET RIPLEY.
WILLIAM N. GLADSON.

Witnesses to the names of G. E. Ripley and W. N. Gladson:
L. R. HULSE,
P. L. MARDIS.

In testimony whereof I have signed my name to this specification in the presence of two subscribing witnesses.

ROSS EMILE THOMPSON.

Witnesses to the name of R. E. Thompson:
BERNIECE BOWMAN,
P. F. HULSEY.

Copies of this patent may be obtained for five cents each, by addressing the "Commissioner of Patents, Washington, D. C."